(12) United States Patent
Attali

(10) Patent No.: US 10,796,595 B1
(45) Date of Patent: Oct. 6, 2020

(54) SYSTEMS AND METHODS FOR COMPUTER-BASED TRAINING OF CROWD-SOURCED RATERS

(71) Applicant: Educational Testing Service, Princeton, NJ (US)

(72) Inventor: Yigal Attali, Princeton, NJ (US)

(73) Assignee: Educational Testing Service, Princeton, NJ (US)

( * ) Notice: Subject to any disclaimer, the term of this patent is extended or adjusted under 35 U.S.C. 154(b) by 386 days.

(21) Appl. No.: 14/942,473

(22) Filed: Nov. 16, 2015

Related U.S. Application Data

(60) Provisional application No. 62/079,976, filed on Nov. 14, 2014.

(51) Int. Cl.
| G09B 19/00 | (2006.01) |
| G09B 7/00 | (2006.01) |
| G09B 7/02 | (2006.01) |
| G06Q 50/20 | (2012.01) |
| G09B 5/00 | (2006.01) |

(52) U.S. Cl.
CPC .............. *G09B 19/00* (2013.01); *G09B 7/00* (2013.01); *G09B 7/02* (2013.01); *G06Q 50/20* (2013.01); *G06Q 50/205* (2013.01); *G09B 5/00* (2013.01)

(58) Field of Classification Search
CPC ... G09B 7/02; G09B 7/00; G09B 5/00; G09B 19/00; G06Q 50/20; G06Q 50/205
USPC ........................................................ 434/219
See application file for complete search history.

(56) References Cited

U.S. PATENT DOCUMENTS

| 5,987,302 A | * | 11/1999 | Driscoll | ................. | G09B 5/065 |
| | | | | | 382/321 |
| 5,991,595 A | * | 11/1999 | Romano | .................. | G09B 7/02 |
| | | | | | 382/321 |
| 6,869,287 B1 | * | 3/2005 | Tadlock | ................. | G09B 17/00 |
| | | | | | 434/178 |

(Continued)

OTHER PUBLICATIONS

Attali, Yigal, Lewis, Will, Steier, Michael; Scoring with the Computer: Alternative Procedures for Improving the Reliability of Holistic Essay Scoring; Language Testing, 30(1); pp. 125-141; Jan. 2013.

(Continued)

*Primary Examiner* — Jack Yip
(74) *Attorney, Agent, or Firm* — Jones Day

(57) ABSTRACT

Systems and methods for training raters to rate constructed responses to tasks are described herein. In one embodiment, a plurality of trainee raters are selected without regard to their prior experience. The trainee raters are then train in individual training sessions, during which they are asked to rate responses to a task. Each session presents to the trainee rater the task, a rating rubric, and training responses to the task. The training program receives ratings assigned by the trainee rater to the training responses through a graphical user interface. Upon receiving the assigned rating, the training program presents feedback substantially immediately and determines a score for the trainee rater's assigned rating. Thereafter, qualified raters are selected from the plurality of trainee raters based upon their performance during the training sessions as compared with a statistical model. Operational constructed responses are then assigned to rated by the qualified raters.

23 Claims, 8 Drawing Sheets

(56) References Cited

U.S. PATENT DOCUMENTS

| | | | | |
|---|---|---|---|---|
| 8,554,601 | B1* | 10/2013 | Marsh | G06Q 30/0278 705/7.32 |
| 2004/0015329 | A1* | 1/2004 | Shayegan | G09B 23/28 702/179 |
| 2007/0218450 | A1* | 9/2007 | MacClay | G09B 5/00 434/353 |
| 2009/0119258 | A1* | 5/2009 | Petty | G06Q 30/02 |
| 2011/0225203 | A1* | 9/2011 | Hart-Davidson | G06Q 10/10 707/792 |
| 2011/0307495 | A1* | 12/2011 | Shoshan | G06F 17/2854 707/748 |
| 2012/0034591 | A1* | 2/2012 | Morse, III | G09B 7/00 434/353 |
| 2012/0231438 | A1* | 9/2012 | Fakhrai | G09B 7/00 434/350 |
| 2014/0317147 | A1* | 10/2014 | Wu | G06Q 50/18 707/792 |

OTHER PUBLICATIONS

Bachman, Lyle, Lynch, Brian, Mason, Maureen; Investigating Variability in Tasks and Rater Judgments in a Performance Test of Foreign Language Speaking; Language Testing, 12(2); pp. 238-257; Jul. 1995.

Baldwin, Doug, Fowles, Mary, Livinston, Skip; Guidelines for Constructed-Response and Other Performance Assessments; Educational Testing Service; Princeton, NJ; 2005.

Barrett, Steven; The Impact of Training on Rater Variability; International Education Journal, 2(1); pp. 49-58; 2001.

Breland, Hunter, Bridgeman, Brent, Fowles, Mary; Writing Assessment in Admission to Higher Education: Review and Framework; College Board Report No. 99-3; New York: College Entrance Examination Board; 1999.

Breland, Hunter, Camp, R., Jones, R., Morris, M., Rock, D.; Assessing Writing Skill: Research Monograph No. 11; New York: College Entrance Examination Board; 1987.

Buhrmester, Michael, Kwang, Tracy, Gosling, Samuel; Amazon's Mechanical Turk: A New Source of Inexpensive, Yet High-Quality, Data?; Perspectives on Psychological Science, 6(1); pp. 3-5; Feb. 2011.

Diederich, Paul, French, John, Carlton, Sydell; Factors in Judgments of Writing Ability; Educational Testing Service, Research Bulletin RB-61-15; Princeton: New Jersey; Aug. 1961.

Eckes, Thomas; Rater Types in Writing Performance Assessments: A Classification Approach to Rater Variability; Language Testing, 25(2); pp. 155-185; Apr. 2008.

Elder, Cathie, Knoch, Ute, Barkhuizen, Gary, Von Randow, Janet; Individual Feedback to Enhance Rater Training: Does It Work?; Language Assessment Quarterly, 2(3); pp. 175-196; 2005.

Engelhard, George; Examining Rater Errors in the Assessment of Written Composition With a Many-Faceted Rasch Model; Journal of Educational Measurement, 31(2); pp. 93-112; May 1994.

Engelhard, George, Myford, Carol; Monitoring Faculty Consultant Performance in the Advanced Placement English Literature and Composition Program with a Many-Faceted Rasch Model; College Board Research Report No. 2003-1; New York: College Entrance Examination Board; 2003.

Glover, John; The 'Testing' Phenomenon: Not Gone but Nearly Forgotten; Journal of Educational Psychology, 81(3); pp. 392-399; 1989.

Hoyle, Rick, Panter, Abigail; Writing About Structural Equation Models; Ch. 9 in Structural Equation Modeling: Concepts, Issues, and Applications, R. Hoyle (Ed.); Sage Publishing; pp. 159-176; 1995.

Karpicke, Jeffrey, Blunt, Janell; Retrieval Practice Produces More Learning than Elaborative Studying with Concept Mapping; Science, 331(6018); pp. 772-775; Feb. 2011.

Knoch, Ute; Investigating the Effectiveness of Individualized Feedback to Rating Behavior—A Longitudinal Study; Language Testing, 28(2); pp. 179-200; Apr. 2011.

Lumley, Tom, McNamara, T.F.; Rater Characteristics and Rater Bias: Implications for Training; Language Testing, 12(1); pp. 54-71; Mar. 1995.

Lunt, Helen, Morton, Janne, Wigglesworth, Gillian; Rater Behaviour in Performance Testing: Evaluating the Effect of Bias Feedback; Paper presented at 19th Annual Congress of Applied Linguistics Association of Australia: University of Melbourne; Jul. 1994.

McClellan, Catherine; Constructed-Response Scoring: Doing It Right; ETS R&D Connections, 13; Educational Testing Service: Princeton, NJ; Feb. 2010.

Moss, Pamela; Can There Be Validity Without Reliability?; Educational Researcher, 23(2); pp. 5-12; Mar. 1994.

O'Sullivan, Barry, Rignall, Mark; Assessing the Value of Bias Analysis Feedback to Raters for the IELTS Writing Module; Ch. 11 in IELTS Collected Papers, L. Taylor & P. Falvey (Eds.); Cambridge University Press: Cambridge, UK; pp. 446-476; 2007.

Powers, Donald; "Wordiness": A Selective Review of Its Influence, and Suggestions for Investigating Its Relevance in Tests Requiring Extended Written Responses; ETZS RM-04-08; Educational Testing Service: Princeton, NJ; Feb. 2005.

Roediger, Henry, Karpicke, Jeffrey; Test-Enhanced Learning: Taking Memory Tests Improves Long-Term Retention; Psychological Science, 17(3); pp. 249-255; 2006.

Rosseel, Yves; lavaan: An R Package for Structural Equation Modeling; Journal of Statistical Software, 48(2); pp. 1-36; May 2012.

Weigle, Sara; Using FACETS to Model Rater Training Effects; Language Testing, 15(2); pp. 263-287; Apr. 1998.

Weigle, Sara; Investigating Rater/Prompt Interactions in Writing Assessment: Quantitative and Qualitative Approaches; Assessing Writing, 6(2); pp. 145-178; 1999.

Wolfe, Edward, Matthews, Staci, Vickers, Daisy; The Effectiveness and Efficiency of Distributed Online, Regional Online, and Regional Face-To-Face Training for Writing Assessment Raters; The Journal of Technology, Learning, and Assessment, 10(1); Jul. 2010.

* cited by examiner

Figure 3A

Training Session – Directions

You are going to train in grading responses to a persuasive essay writing task.

In this task, the students were asked to analyze an issue – the influence of electronic media on meaningful communication. You can find the specific task in the right panel under the student task tab. The scoring guide describes each of the possible score levels (1-6). The scoring guide notes include the main points that should guide you in your evaluation. The benchmarks are real student responses that represent the 6 scoring levels 1-6. The library will be updated with the responses you score during training.

Read carefully the student task (first tab) and benchmarks (4th tab). The benchmarks are your primary guide for determining what score to award each essay.

In this training session you will receive immediate feedback on the correctness of your evaluation. If your score matches with the correct score, you will get 3 points. If your score is off by one point (e.g., you awarded a score of 3 and the correct score was 5) you will get 1 point. You will not get any points if you are off by more than one point.

The number of points you earn in this session will determine if you can continue with further scoring sessions.

There will be 20 responses to score in this session.

Task Documents

| Student Task | Scoring Guide | Scoring Notes | Anchor Responses | Library |

Analyze an Issue

High-speed electronic communications media, such as electronic mail and television, tend to prevent meaningful and thoughtful communication.

Directions

Discuss the extent to which you agree or disagree with the statement above and explain your reasoning for the position you take. In developing and supporting your position, you should consider ways in which the statement might or might not hold true and explain how these considerations shape your position.

[Start Session]

Figure 3B

Response 15 of 20

Evaluate the response below.

High-speed electronic communications tend to prevent meaningful and thoughtful communication. With the technology growing so fast a person doesn't have to be face to face with someone in order to communicate. I believe that it is crucial for a person to have social interaction rather than do everything electronically. For one, it helps them develop better socialization skills.

My first example of this is email that almost everyone uses to communicate rather than calling a person or talking to them in person. Email is great, but you don't always get to express yourself as you would in person. It's not always as easy to say what you really mean when you type it on the screen. I think email is used more than it should be and it can be misinterpreted which can lead to more problems. You may type something that you think is funny but when someone else reads it, they don't interpret it the same way. You have to be careful with this kind of communication so you don't end up hurting people.

Another example is instant messenger where you can type back and forth and receive the messages instantly on your screen. The downfall of this is that you miss out on seeing a person's facial expressions or hand gestures when you are face to face with them. I think people need to remember to take time out of their busy lives and have real face to face socializing.

Finally, you can watch video clips which don't always portray what they want to. You may only see or hear what you want to which Task Documents Anchor responses are real student responses that are clear examples of each of the scoring levels. Each is labeled with the score point that the response was awarded and followed by commentary explaining why the response was given the score it received.

- Score 6 - Outstanding
- Score 5 - Strong
- Score 4 - Adequate
- Score 3 - Limited
- ▼ Score 2 - Seriously Flawed It is evident that the electronic communications media is very usefull and widely used today. It is commonly used because it's high speed and convience for most people. We can talk to our friends and have a reply in other country immediately, which we cannot without it. Moreover, this kind of communication is low in price compared with letter or fax. It is now easy to talk to your friends from anywhere in the world. So thoughtfull communication is preserved.

However, it seems that it also prevent meaningfull communication between people. I do not agree this point. We can write any thing in email instead of letter. It is also meaningfull to use e-mail to give a birthday card to your friend. Isn't it? It is just a form to express your care about your friends. Someone may say that the card sent by computer cannot be stored in a floppy in fact.

Therefore, high-speed electronic communications media only help us to communicate more convience. It will not stop the meaningfull communication but only stop the thoughtfull communication.

- Score 1 - Fundamentally Deficient

Figure 3C
Response 18 of 20

Evaluate the response below.

I do not think "High-speed electronic communications media, such as electronic mail and television, tend to prevent meaningful and thoughtful communication." I believe electronic communication enhances communication. Technology used in television, cell phones, e-mail, web-sites, chat-sites, web camera, and other communication devices has enhanced the way the world today communicates. If a person has a computer with an internet hook-up, the world is at their fingertips. With a computer, you can communicate not only with someone in the next state, but also with a person in a country clear across the other side of the world. People can communicate faster to each other today with the use of the computer and the television. Although it is hard to imagine a loved one living far away from you especially in a time of war, it is comforting to know that with the use of a computer you may be able to communicate to this person quickly and inexpensively. I have seen on television, how people in the war over seas were able to send a holiday greeting to their loved one. This is not only wonderful for the ones sending and recieving it, but also for others viewing it, who may also have family in the war. I believe high-speed electronic communications media, such as electronic mail and television, enhances meaningful and thoughtful communication with people across the world especially in times of war.

Score: 1  2  3  4  5  6

Submit Score

Task Documents

This is the scoring guide that you will use as the basis for the scores you assign. It includes the possible score points and the criteria that describe student responses at each level.

6 – Outstanding

A 6 paper presents a cogent, well-articulated analysis of the complexities of the issue and conveys meaning skillfully.

A typical paper in this category
- presents an insightful position on the issue
- develops the position with compelling reasons and/or persuasive examples
- sustains a well-focused, well-organized analysis, connecting ideas logically
- expresses ideas fluently and precisely, using effective vocabulary and sentence variety
- demonstrates facility with the conventions (i.e., grammar, usage, and mechanics) of standard written English but may have minor errors

5 – Strong

A 5 paper presents a generally thoughtful, well-developed analysis of the complexities of the issue and conveys meaning clearly.

A typical paper in this category
- presents a well-considered position on the issue
- develops the position with logically sound reasons and/or well-chosen examples
- is focused and generally well organized, connecting ideas appropriately
- expresses ideas clearly and well, using appropriate vocabulary and sentence variety
- demonstrates facility with the conventions of standard written English but may have minor errors

4 – Adequate

A 4 paper presents a competent analysis of the issue and conveys meaning adequately.

A typical paper in this category
- presents a clear position on the issue
- develops the position on the issue with relevant reasons and/or examples
- is adequately focused and organized
- expresses ideas with reasonable clarity
- generally demonstrates control of the conventions of standard written English but may have some errors

Figure 3D

However, we can do important communication by means of these media. Sometimes we can't say thank you or apologize directly because we become nervous and shy, but we can show our appreciation or apology easily in a situation that we don't see people's face. In addition, we can consider what to say for as long time as we like before telling our message. Consequently, we can make meaningful and thoughtful communications,using electronic communications media.

In conclusion, these media has good points and bad points. We can utilize it depending Score:   1   2   3   4   5   6

Next Response

● The correct score is low 3.
You received 3 points for this response.
So far, you received a total of 24 points out of 51 possible points.
This response was added to your library.

SYSTEMS AND METHODS FOR COMPUTER-BASED TRAINING OF CROWD-SOURCED RATERS

CROSS-REFERENCE TO RELATED APPLICATIONS

The present application claims the benefit of U.S. Provisional Application Ser. No. 62/079,976, titled "Systems and Methods for Computer Based Scoring of Essays Using Crowd Sourced Scorers," filed Nov. 14, 2014, the entirety of which is hereby incorporated by reference.

FIELD

This disclosure is related generally to computerized training and more particularly to training of raters for rating constructed responses.

BACKGROUND

When performing assessments—especially in large scale, high-stakes situations like standardized testing—a primary goal is to ensure that raters base their assessment on similar characteristics to achieve reasonable consistency across ratings. However, performance assessments by humans are susceptible to subjective judgment, which fosters inconsistent results. This is especially true for rating constructed responses to tasks, such as written essay responses, since such assessment involves a human rater's holistic judgment based on their own skills, evaluation criteria, and experience. For example, raters (scorers) may differ in how they assess and weigh response characteristics, such as sentence construction, grammar, flow, logic, organization, response length, and others. Even if provided with rating guidelines, raters may differ in their interpretation of the guidelines. As a result, the reliability of large-scale writing assessment is often lower compared to other types of examination, such as multiple-choice tests.

Because rater variability is a source of construct-irrelevant variance, rater selection and training is commonly employed to limit such variation. For example, test administrators conventionally require raters to meet specific background qualifications, such as a certain level of education (e.g., at least a Bachelor's degree), academic focus (e.g., English and linguistics), professional experience or past training in rating/scoring, among others. In addition to these requirements, raters typically have to undergo lengthy training. Naturally, hiring experienced raters meeting these qualifications and providing lengthy training can significantly add to the cost of test assessment.

The present inventors have recognized and appreciated a need for improved approaches to train raters of constructed responses.

SUMMARY

The systems and methods described herein provide robust means to systematically and efficiently train raters, including even those who lack the predetermined background or experience, so that they can consistently and reliably assess constructed responses. The systems and methods described herein comprise administering short (e.g., 30 minutes) individualized training sessions, during which participating trainee raters are asked to rate a series of training responses to a particular task (e.g., essay prompt). Through a graphical user interface on a computer device, trainee raters are able to assign ratings for the training responses. Upon receiving a rating from a trainee rater, the systems and methods described herein provide substantially immediate feedback to the trainee rater to inform him/her of whether the assigned rating is correct and the underlying reasons for such a determination. Through this process, the trainee raters are trained to properly assess constructed responses to the task. At the conclusion of the training sessions, those trainee raters who have passed a predetermined threshold level of performance measure can then be asked to proceed to rate actual or operational constructed responses (e.g., essays written by students or test takers). The inventor has compared the performance of the newly trained raters using the systems and methods described herein to that of expert raters with extensive experience in rating responses to the writing task. Results show that the ratings from the newly-trained group of raters exhibit similar measurement properties (mean and variability of scores, reliability and various validity coefficients, and underlying factor structure) to those from of experienced group of raters. Therefore, the systems and methods described herein allow test administrators to hire inexperienced raters, such as those found from crowd sourcing networks/interfaces, to assess constructed responses, rather than being limited to hiring experienced professionals to perform the same task, which is conventionally the case.

Described herein are exemplary embodiments of computer-implemented methods and systems for training raters to rate constructed responses to tasks. In some embodiments, a processing system may select a plurality of trainee raters for rating constructed responses without regard to particular rating experience (e.g., prior work experience as a rater) and/or particular subject matter expertise (e.g., education credentials in language, linguistics, or other discipline). The processing system may further train, in individual training sessions, the trainee raters to rate responses to a task. Each individual training session provides training for a single rater. During an individual training session, the processing system may present the task using an interactive graphical user interface. The processing system may further present a rating rubric including a rating scale with a plurality of rating levels, descriptions of dimensions on which rating is to be based, and exemplary responses corresponding to the rating levels. Also, the processing system may present training responses to the task using the interactive graphical user interface. Through the interactive graphical user interface, the processing system may receive ratings assigned to the training responses by the trainee rater. Upon receipt of the rating assigned by the trainee rater, the processing system may present feedback substantially immediately and determine a score for each of the received rating assigned by the trainee rater. The processing system may also determine multiple statistical measures for the trainee rater's performance (e.g., including the scores received by the trainee rater) during the individual training session, and analyze the statistical measures for the trainee rater's performance using a statistical computer model trained based on a reference pool of different trainee raters previously selected as qualified. Thereafter, the processing system may select qualified raters from the plurality of trainee raters based upon the analysis of the statistical measures from the individual training sessions and assign to the qualified raters one or more constructed responses to be rated. Exemplary methods and non-transitory computer readable media having instructions adapted to cause a processing system to execute the exemplary approaches are also described.

BRIEF DESCRIPTION OF THE DRAWINGS

FIGS. 3A-3D are exemplary

DETAILED DESCRIPTION

Systems and methods described herein improve upon computer-based training technology by providing robust and efficient ways for raters—whether experienced or not in rating constructed responses—to provide consistent and reliable ratings (especially in large settings such as standardized tests). The systems and methods can be implemented using any suitable combination of hardware, software, and/or firmware using algorithms implemented in any suitable programming language such that a processing system of a computer system is configured to carry out the exemplary approaches described herein.

Figure 1:
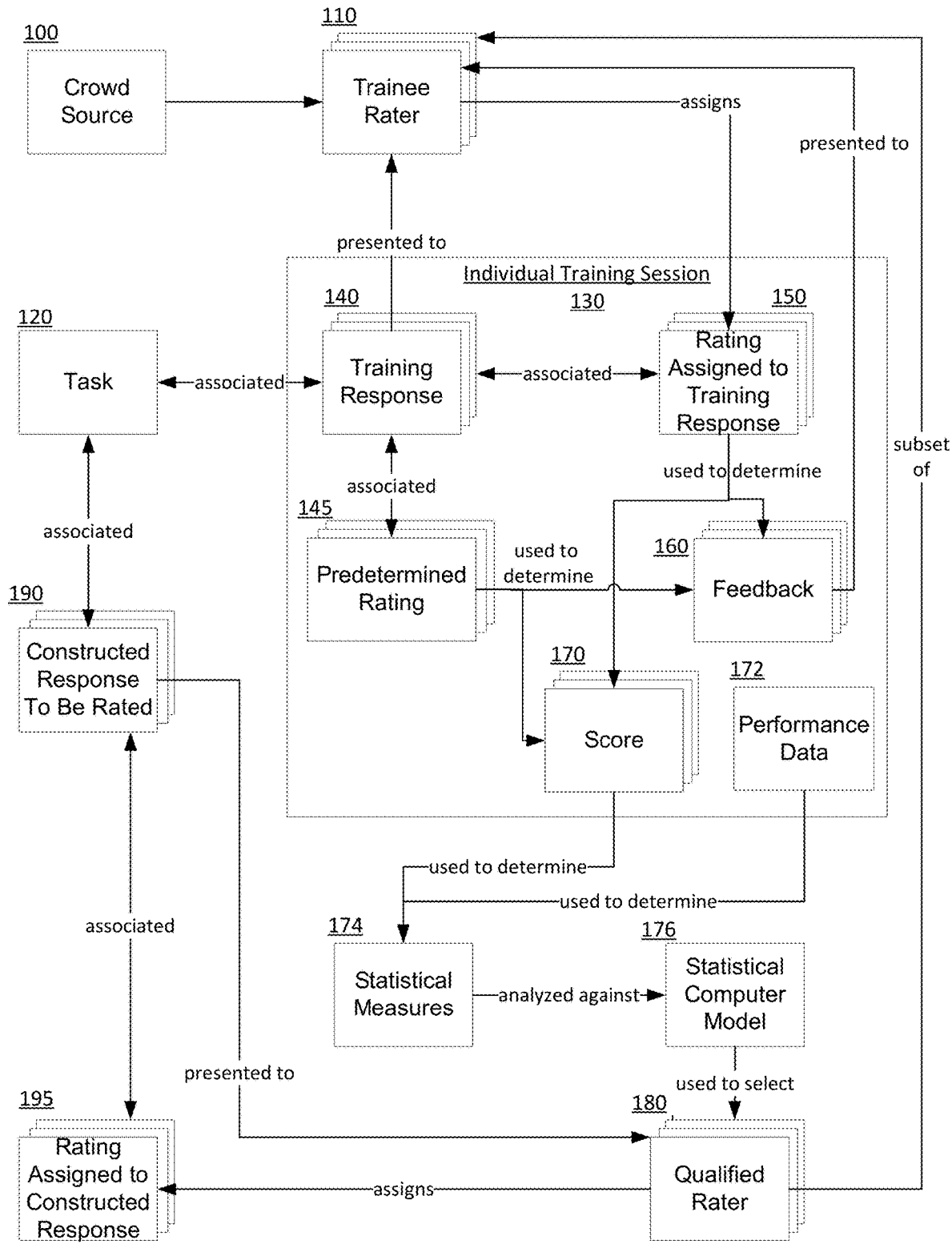
FIG. 1 is a block diagram depicting various aspects of the systems and methods for training raters to rate constructed responses to a task.

FIG. 1 is a block diagram depicting various aspects of an exemplary system for training raters for assessing constructed responses to writing tasks. In exemplary embodiments, candidate raters or scorers, who are referred to as trainee raters 110, can be selected from a pool of candidates, such as via a crowd sourcing network or interface 100. While trainee raters 110 can be selected based on initial selection criteria (e.g., based on educational qualifications, such as degrees obtained, grade point averages, certifications, etc., and experience in particular subject area, such as English, linguistics, history, science, etc., and/or the like), such initial screening based on background qualifications is not necessary. This is one of the advantages of the systems and methods described herein over conventional training programs. For example, using the systems and methods described herein, trainee raters 110 can be selected without regard to their particular rating experience and/or particular subject matter expertise, such as educational background, training, or experience (e.g., some trainee raters 110 may be individuals without prior rating experience and without educational credentials in language, linguistics, or a particular discipline). The practical benefit of this is that test administrators would have a much larger pool of potential raters to draw from and at potentially much reduced cost compared to the conventional practice of hiring experienced raters with particular qualifications. Nevertheless, as a result of the efficiencies of the exemplary computerized training approaches described herein, a resulting pool of qualified raters can be established. Thus, in one exemplary embodiment, the trainee raters 110 are selected using crowd sourcing without regard to the trainee raters' prior experience.

The pool of trainee raters 110 then undergo training using the systems and methods described herein to assess constructed responses (e.g., essays, short answers, and/or the like) to a particular task 120, which are responses other than true-false or multiple-choice type responses. In one embodiment, training is provided using a computer-implemented interactive program with an interactive graphical user interface. For example, the training program can be a software application running on a conventional personal computer, an app running on a mobile device, a Web-based application being hosted on a web server and accessed using conventional Web browsers, and other platforms known in the art. Through this training program, each trainee rater 110 participates in an individual training session 130. The individual training sessions 130 may be administered at the same time to all trainee raters 110 (e.g., all training sessions begin and end at designated times) or be taken by individual trainee raters 110 at different times based on convenience.

In each individual training session 130, the corresponding trainee rater 110 is provided with instructions and guidance for rating responses to a particular task 120. For example, through its interactive graphical user interface, the training program can present the trainee rater 110 with the task 120 to which responses to be rated are directed (e.g., the task could be an essay topic or prompt, instructions for analyzing a passage, a question, etc.). In certain embodiments, the trainee rater 110 could also be presented with a rating rubric, which could include a rating scale with a plurality of rating levels (e.g., 1 through 6, with 1 corresponding to a deficient response and 6 corresponding to an outstanding response), descriptions of dimensions on which rating is to be based (e.g., whether the response presents and develops a clear position on an issue, whether it provides an insightful position, whether it is well organized, the extent of mechanical errors, etc.), and/or exemplary responses corresponding to each rating level. In some implementations, information relating to the rating rubric can be made available through a menu interface and be concurrently displayed with the training responses.

During each individual training session 130, the participating trainee rater 110 is presented with and asked to rate one or more training responses 140. In some implementations, the training responses 140 are constructed responses to the task 120 with predetermined ratings 145 assigned by "expert" raters with the proper qualifications (e.g., expert or professional raters). The trainee rater 110 is asked to review each training response 140 and assign an appropriate rating 150 (e.g., on a scale of 1 through 6) based on the rating rubric provided. In some implementations, the trainee rater 110 can input the assigned rating 150 using the training program's interactive graphical user interface (e.g., by clicking or touching a virtual button associated with a rating, typing a rating, etc.). In some implementations, the trainee rater 110 may also be allowed to annotate (e.g., highlight, add comment, etc.) the training response 140 to indicate the basis or rationale for the assigned rating 150.

Upon receiving a rating 150 for a training response 140, the training program compares the rating assignment 150 to the predetermined rating 145 for that training response 140. Based on the comparison, the training program generates a feedback 160. Depending on the desired implementation, the feedback 160 can show the trainee rater 110 the correct rating (i.e., the predetermined rating 145), a comparison of the trainee rater's assigned rating 150 and the predetermined rating 145, an explanation or message indicating any discrepancy between the assigned rating 150 and the predetermined rating 145, an explanation of why the predetermined rating 145 is correct, identification of key portions of the training response 140 that influenced the rating 145, etc. In some embodiments, the feedback 160 is presented substantially immediately upon receiving a training response 150 from the trainee rater 110.

In some embodiments, the training program can generate a score 170 for each rating 150 assigned by the trainee rater 110. For example, the score may be based on a comparison of the assigned rating 150 to the predetermined rating 145. For instance, the system may generate a score of 3 for an exact agreement between the assigned rating 150 and the predetermined rating 145, a score of 1 for a one-point discrepancy (i.e., adjacent agreement), and a score of 0 for any larger discrepancies. In some implementations, the scores 170 received by a trainee rater 110 can be aggregated to generate a final score to represent the performance of the trainee rater 110 in the individual training session 130. The feedback 160 presented to the trainee rater 110 can include the score 170 he/she received for the instant rating as well as the running total of the final score.

During the training session, various performance data 172 may be tracked. In some embodiments, performance data 172 can include the ratings 150 assigned by the trainee rater 110 and/or the corresponding scores 172. In addition, performance data 172 can include the trainee rater's 110 input or navigation sequences and patterns tracked during the individual training session 130 (performance data 172 may also be derived from the information or metrics tracked). This may include, for example, mouse movement and clicks, menu selection, time lapse between actions (e.g., time between when a training response 140 is presented and a rating 150 is assigned), scoring 172 trend as the session 130 progresses, navigation sequence (e.g., showing whether the trainee rater 110 reviews the rating rubric and other instructions after receiving a feedback 160), and/or other information derived from the trainee rater's 110 navigation pattern.

At the conclusion of the individual training sessions 130 (e.g., after the trainee rater 110 has rated a predetermined number of training responses 140), performances of the trainee raters 110 are analyzed. In some embodiments, the system determines multiple statistical measures 174 for each trainee rater's 110 performance during his/her individual training session 130. The underlying data for the statistical measures 174 may include the scores 170 and the performance data 172 tracked during the individual training session 130. Examples of the statistical measures 174 include: overall performance score (e.g., the mean and/or median of the scores 170); rating consistency or pattern (e.g., represented by standard deviation of the assigned ratings 150 or other measures of scatter characteristics); consistency of rating correctness (e.g., represented by standard deviation of the received scores 170); measure of improvement over the course of the training session 130 or one or more training sessions (e.g., represented by a regression slope of the received scores 170 plotted against the chronological sequence in which the scores were received); factoring the difficulty level of rating each training response 140 (e.g., applying a weight to each score 170 based on a known difficulty level of rating the corresponding training response 140); response time (e.g., represented by an average of the time lapse between when a training response 140 is presented and a rating assigned); desire to improve (e.g., represented by the frequency and/or time spent reviewing the rating rubric after feedbacks are presented); attention to the rating rubrics (e.g., represented by the time spent on reviewing the rating rubric at the beginning of the training session 130 or while analyzing a training response 140); and/or other performance measurements.

The statistical measures 174 for each trainee rater 110 are then analyzed against similar statistical measures of historic trainee raters who have been deemed to be qualified. In some embodiments, the statistical measures of historical trainee raters could be represented by a statistical computer model 176. The statistical computer model 176, for example, could be trained based on a reference pool of different trainee raters previously selected as qualified. For instance, this reference pool of different trainee raters could have undergone similar individual training sessions (the training sessions may or may not be the same as the instant training sessions 130—e.g., the task and training responses may be the same or different, depending on the implementation). The resulting statistical measures of the group of qualified raters, the group of unqualified raters, or both can be used to determine the statistical computer model 176. In one implementation, the statistical computer model may comprise a series of threshold values for each of the statistical measures 174 of interest. For example, the average scores of known qualified raters and the standard deviation may be one aspect of the statistical computer model 176 used to determine whether an instant trainee rater 110 qualifies. In this example, if the trainee rater's 110 average score falls within one standard deviation of the average score of known qualified raters, it suggests that the instant trainee rater 110 probably should qualify as well. Comparisons of other statistical measures may be similarly performed and a final determination of qualification can be based on the aggregate of the comparisons.

In another embodiment, the statistical computer model 176 can comprise a linear combination of weighted features (e.g., numerical representations of the statistical measures) that predicts whether a trainee is qualified or unqualified. In one example of such a model 176, the features would constitute the independent variables and the qualification prediction would constitute the dependent variable. Such a model 176 could be trained using the statistical measures of the reference pool of different trainee raters as values for the independent variables and the known qualification determination as values for the dependent variable. Training may be performed using, e.g., linear regression to find the best-fit coefficients for each of the features in the model 176. When analyzing the instant statistical measures 174 against the statistical computer model 176, the statistical measures 174 may be plugged into the independent variables of the model 176 to generate an output that represents whether the associated trainee rater 110 qualified.

The result of analyzing the trainee raters' 110 statistical measures 174 against the statistical computer model 176 can then be used to select qualified raters 180. For example, the qualification criteria may be based in part on the output of the statistical computer model 176 (e.g., whether the value output by the model 176 exceeds a certain threshold, thereby suggesting a qualified rater). Additional selection criteria may also be imposed, e.g., a qualifying rater is required to have assigned the correct rating at least 50% of the times (e.g., getting 25 exact agreements out of 50 training responses), and with no more than two ratings that differ by more than a point (adjacent agreement) from the correct rating.

The pool of qualified raters 180 may then be asked to rate actual or operational constructed responses 190 (e.g., examinee's written essays or short answers) to the task 120. The system may assign the qualified raters 180 one or more constructed responses 190 to be rated. These constructed responses 190 are associated with the task 120 which the qualified raters 180 were trained to assess. However, in some embodiments, the qualified raters 180 may be trained on one or more paradigmatic tasks, but are expected to operationally rate responses to other tasks. The qualified raters 180 then assign ratings 195 to the constructed responses 190. In some implementations, the same constructed response 190 may be assigned to more than one qualified rater 180, in which case the final rating for the constructed response would be based on the collective ratings 195 assigned by the raters 180 (e.g., the final rating may be an average of the ratings 195 received).

In some embodiments, the individual training session 130 is the only training that a trainee rater 110 would receive before being asked to rate actual constructed responses 190. In other words, the qualified raters 180 do not receive additional training after the initial individual training sessions 130 and before the qualified raters 180 are assigned the actual constructed responses 190. Thus, the duration of training can be limited to the duration of an individual training session, which could be, e.g., 30 minutes. This is much shorter than conventional training for raters, which could include separate training, practice, and certification sessions, thus taking hours or even days. In some embodiments, the training for a trainee rater could be completed in its entirety in a single individual training session.

In some embodiments, additional quality assurance procedures may be implemented during the actual ratings of the constructed responses 190 to periodically remind the qualified raters 180 of the proper analysis for assessment. For example, during the actual rating of constructed responses 190, the training program may periodically present quality-assurance responses without informing the qualified rater 180 the nature of the presented response (e.g., there would be no indication of whether a presented response is selected from one of the constructed responses 190 or the quality-assurance responses). Quality-assurance responses are similar to the previously described training responses 140 in that they are constructed responses to the task 120 and have predetermined ratings assigned by expert raters. When the presented response is a quality-assurance response, the training program, upon receiving a rating for the response from the qualified rater 180, presents feedback based on a comparison of the received rating and the predetermined rating of the quality-assurance response. The feedback may provide similar information as that of the feedbacks 160 presented during the individual training sessions 130. In doing so, the qualified rater 180 is periodically reminded of how responses should be assessed, which also differs from conventional assessment methods.

Figure 2:
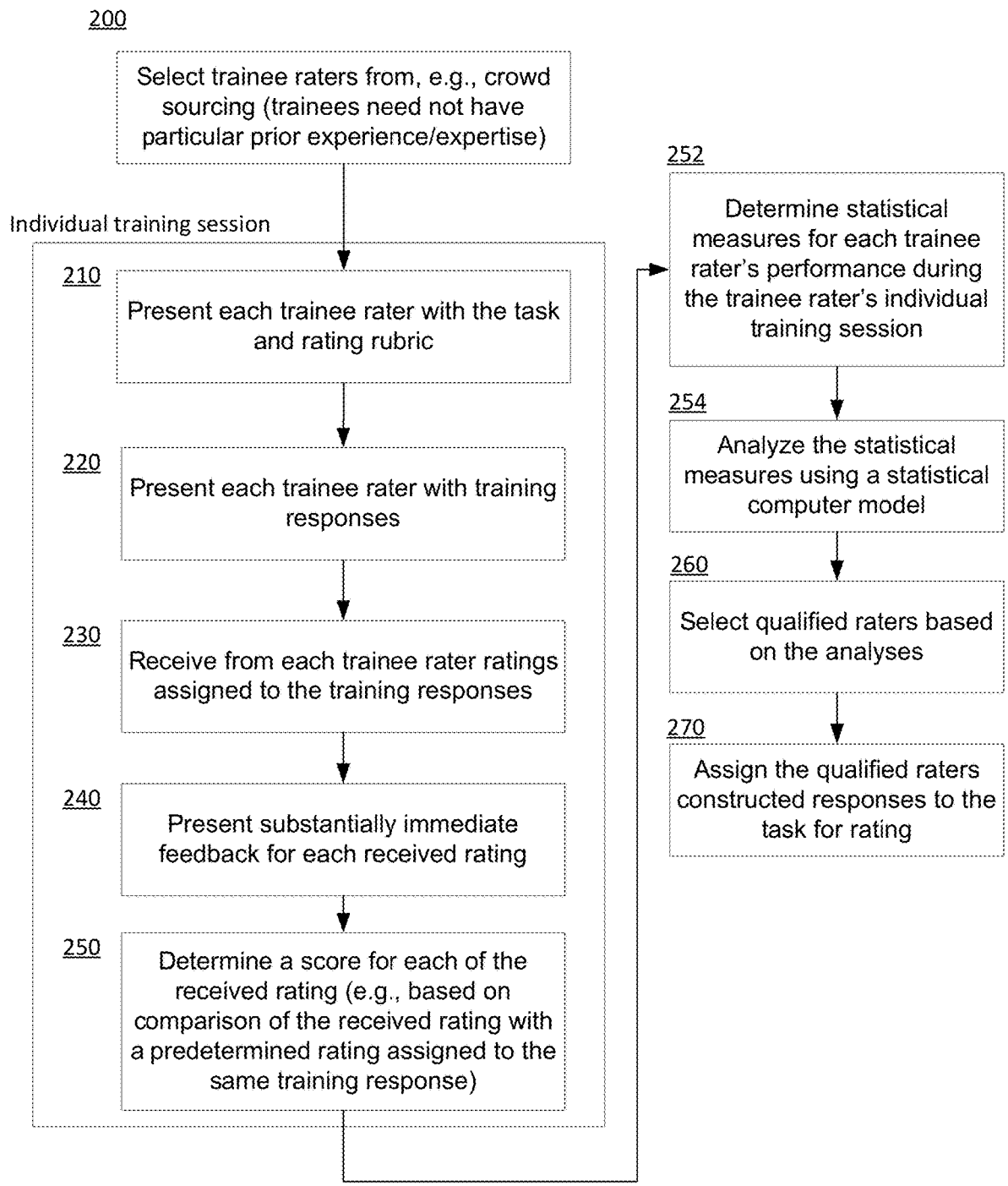
FIG. 2 is a flow diagram depicting a computer-implemented method of training raters to rate constructed responses to a task.

FIG. 2 shows a flow diagram of the systems and methods described herein, which allows trainee raters to be selected from individuals who do not necessarily have the conventionally required backgrounds (e.g., prior grading experience or educational credentials in language or linguistics). In the embodiment shown, at step 200, trainee raters are selected from pool of individuals, such as through crowd sourcing, that may or may not have relevant prior experience rating constructed responses. Each of the selected trainee raters then undergo an individual training session, which in one embodiment comprises the steps 210-250 shown. During an individual training session, the trainee rater is presented, at 210, with the task (e.g., essay prompt, short answer questions, etc.) to which responses are to be rated as well as a rating rubric, as discussed above. At 220, the trainee rater is asked to rate a collection of training responses, which are constructed responses to the task with predetermined ratings (e.g., as assigned by expert raters). At 230, the training program receives ratings assigned by the trainee raters to the training responses. In some implementations, the ratings may be received via an interactive graphical user interface, such as a web page, a software application, a mobile app, etc. At 240, the training program presents a feedback substantially immediately upon receiving an assigned rating from the trainee rater. The feedback, as discussed above, may indicate whether the trainee rater's rating is correct compared to the training response's predetermined rating (e.g., as assigned by expert or otherwise qualified raters) or other messages to educate the trainee rater. At 250, the training program determines a score for each of the received rating based on a comparison of the received rating with the predetermined rating of the training response. The score, for example, may be based on a discrepancy between the trainee rater's rating and the predetermined rating (e.g., a score of 3 if the ratings match, a score of 1 if the ratings do no match but are sufficiently close, etc.). At 252, after the trainee raters have completed the individual training sessions, the system determines statistical measures for each rater's performance during the trainee rater's individual training session. A description of the statistical measures, such as the trainee rater's average score, are described with reference to FIG. 1 above. At 254, the statistical measures are compared against a statistical computer model (e.g., a linear combination of certain statistical measures) trained based on a reference pool of different trainee raters previously selected as qualified. This was also described above with references to FIG. 1. At 260, the system selects qualified raters from the trainee raters the based on the analyses performed using the statistical computer model. At 270, the qualified raters are assigned constructed responses to the task for rating. These constructed responses may be written essay responses to prompts, short answers to exam questions, and/or the like.

FIGS. 3A-3D show an exemplary interactive graphical user interface of the methods and systems described herein. FIG. 3A shows an exemplary initial screen that may be presented to a trainee rater during an individual training session. In this example, directions for completing the training session are presented on the left side of the screen. Here, the trainee rater is asked to rate 20 training responses to a particular task (in thus example, analysis of "the influence of electronic media on meaningful communication"). The individual training session would begin once the trainee rater clicks on the "Start Session" button. FIGS. 3B-3D show examples of the individual training session. As shown those figures, the left side of the screen is used to display the 20 training responses. At the end of each training response is a graphical input interface that invites the trainee rater to select a rating from 1-6, and a button to submit the selected rating. Substantially immediately after a rating is submitted, the training program presents a feedback, as shown in FIG. 3D. The exemplary feedback shown reveals the correct rating for the training response and announces the number of points the trainee rater received for submitting a correct rating (in this case, 3 points). The feedback further reports the trainee rater's current points total. The point total for the 20 training responses received by the trainee rater will be the basis for determining whether the trainee rater would qualify for rating actual student/examinee written responses.

As shown in FIGS. 3A-3C, during the individual training session the trainee rater has access to several tabs on the right side of the screen that provide guidance on how responses should be rated (i.e., the rating rubric). The first tab, Student Task, shows the task for which the responses are written. The second tab, Scoring Guide, lists the possible rating levels and describes the characteristics and criteria expected of responses corresponding to each rating level (an example of the Scoring Guide is shown in FIG. 3C). The third tab, Scoring Notes, presents further interpretation of the scoring guide for the specific task. The fourth tab, Anchor responses, provide benchmark or exemplary responses for each of the rating levels and commentaries explaining why the responses deserve the given rating (an example of the Anchor responses tab is shown in FIG. 3B). Lastly, the fifth tab, Library, is where the trainee rater can access and review the training responses that he/she has rated during the individual training session. The trainee rater is free to navigate the informational tabs during a training session.

The systems and methods for training raters described herein provide condensed and abridged training compared to conventional training. Unlike lengthy conventional training, the training process described herein has review, practice, and certification occurring at substantially the same time (e.g., in a single training session). Moreover, the systems and methods described herein enable test administrators to select raters from a candidate pool (e.g., crowd sourcing) that includes individuals without prior essay/constructed response rating experience and/or proper educational credentials.

Effectiveness of this new training procedure was evaluated by comparing the results of the newly-trained group of raters to the results of an expert group of raters with extensive experience on a particular writing task. In the experimental study, the expert group of raters consisted 16 experienced raters who had successfully passed conventional training and had been rating responses to the particular task for at least nine months. With respect to trainee raters, 48 individuals were recruited from an Internet-based crowd-sourcing marketplace, Amazon.com's Mechanical Turk (MTurk). The trainee raters had varying education backgrounds (6% high school, 17% some college education, 10% associate degree, 58% bachelor's degree, and 8% graduate degree) and grading experiences (46% reported none or very little grading experience, 42% some experience, and 12% extensive experience). Those who reported themselves as having some or extensive experience were asked to describe their experience. The descriptions revealed that none of the participants had any substantial experience in grading (e.g., serving as teaching assistants and grading student responses in a variety of topics but received no formal training certification, or feedback procedure). The trainee raters completed their individual training sessions in 32 minutes on average. Out of the 48 training raters, 14 passed the minimum performance threshold and were invited to participate in additional scoring sessions that include rating constructed responses to an issue prompt and to an argument prompt.

Results were compared with respect to the severity of scores (the degree to which scoring standards are the same across raters), reliability of scores (the consistency of scores across raters), convergent validity (strength of relation between scores from the two groups), and predictive validity of scores (strength of relation of scores with other measures of student writing and verbal ability). The table below presents a summary of some psychometric properties for newly-trained and experienced raters. For each of these measures, a Mann-Whitney U two-sample test was performed to evaluate possible differences between the two groups of raters.

| Measure | Newly-trained Raters (N = 14) | | | Experienced Raters (N = 16) | | |
| --- | --- | --- | --- | --- | --- | --- |
| | Mean Rating | Standard Deviation | Median Rating | Mean Rating | Standard Deviation | Median Rating |
| Average Rating | 3.85 | 0.23 | 3.87 | 3.72 | 0.30 | 3.66 |
| Standard Deviation | 1.04 | 0.08 | 1.04 | 0.89 | 0.12 | 0.87 |
| Correlations of ratings with | | | | | | |
| Essay True Rating | .78 | .08 | .77 | .85 | .07 | .88 |
| Argument Essay True Rating | .54 | .07 | .56 | .57 | .06 | .58 |
| Verbal Measure | .51 | .08 | .53 | .54 | .09 | .55 |
| Number of Words | .54 | .11 | .51 | .63 | .11 | .61 |

With respect to the average ratings, no difference was found between the groups (U=77.5 for the newly-trained group, p=0.16). However, note that the variability of average ratings across raters is smaller for the newly-trained raters (standard deviation of 0.23) than for the experienced raters (standard deviation of 0.30), suggesting a smaller rater effect on rating for the newly-trained raters. This difference is even more noteworthy since the standard deviation of rater ratings (second row in the table) is significantly larger for newly-trained raters (U=33, p<0.1). In other words, newly-trained raters are less variable in their average ratings at the same time that their individual ratings are more variable. Insufficient variability of scores is a frequent problem in constructed response rating—raters often do not use the entire rating scale. In this case, the overall distribution of ratings in the experienced group was 1%, 9%, 30%, 42%, 17%, and 2% for ratings 1-6, respectively, while the overall distribution of ratings in the newly-trained group was 2%, 9%, 23%, 38%, 25%, and 3% for ratings 1-6, respectively.

The bottom part of the table above summarizes correlations of ratings for newly-trained and experienced raters with several validity measures. The first of these is the true rating of the essays that were evaluated. This measure is somewhat biased in favor of the experienced raters since the same ratings from the experienced group were used to calculate it (one of 16 ratings). Nevertheless, the median correlation with true rating was higher in the experienced group (0.88) than in the newly-trained group (0.77) (U=178, p<0.01). However, no difference was found between the groups with respect to two other validity measures, the correlation with the true score on the other (argument) essay that examinees wrote (U=137, p=0.31) and the correlation with the verbal measure of the assessment that the examinees completed (U=135, p=0.36). Finally, whereas the first three measures were convergent validity measures (with an expectation of high correlations), association with essay length can be considered as a discriminant validity measure because it is easy for a less qualified or motivated rater to fall back on essay length as the primary criterion for "evaluation." Surprisingly, newly-trained raters showed lower correlations with essay length than experienced raters (U=161, p<0.01).

In summary, in the experimental testing described herein, newly-trained and experienced raters were quite similar in their score distributions and correlations with validity measures. Conventional wisdom suggests that considerable training is required in order to develop among the raters a shared interpretation of what constitutes good writing and similar rating standards. The results of the present experimental study suggest that evaluating responses using the systems and methods described herein can quickly teach raters what rating standards they are expected to apply, and at the same time can be used to identify raters who cannot apply the expected interpretation of merit. In particular, these procedures de-emphasized study of task materials and example responses, and instead focused on testing with feedback. Indeed, the trainee raters in the experimental study described above spent minimal time reviewing the rating rubrics.

The methods described herein may also be generalized across different tasks/prompts. In the instant experimental study, raters were trained and then applied their training on a single prompt. However, raters of large scale assessments may be trained on a small number of prompts but could apply their training on other prompts, and the aspects of training described elsewhere herein, e.g., prompt feedback, may be applied in training the rater trainees in multiple prompt scenarios. In addition, in other examples of an exemplary training environment, multiple training essays could be administered and more elaborate feedback could be provided. In this experimental study, for example, only the correct score was provided to trainees as feedback, but in other examples according to the approaches described herein, more extensive annotations about the response and explanations for the correct score could be provided to raters during the training process.

Figure 4A:
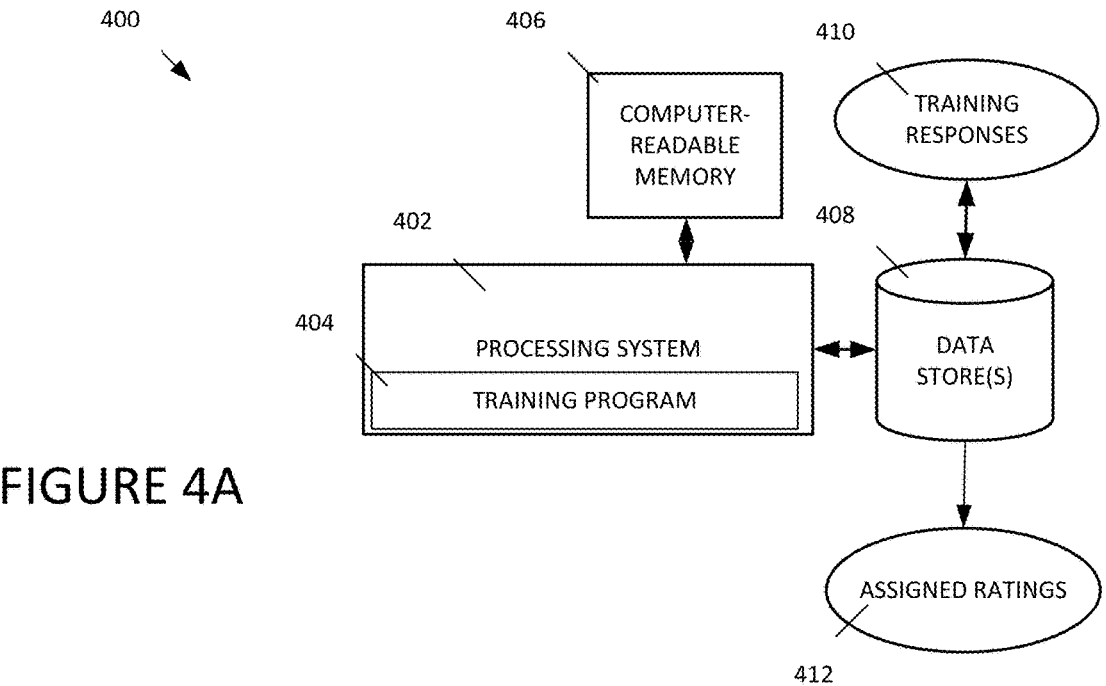
FIGS. 4A-4C depict example systems for use in implementing a system for training raters.
Figure 4B:
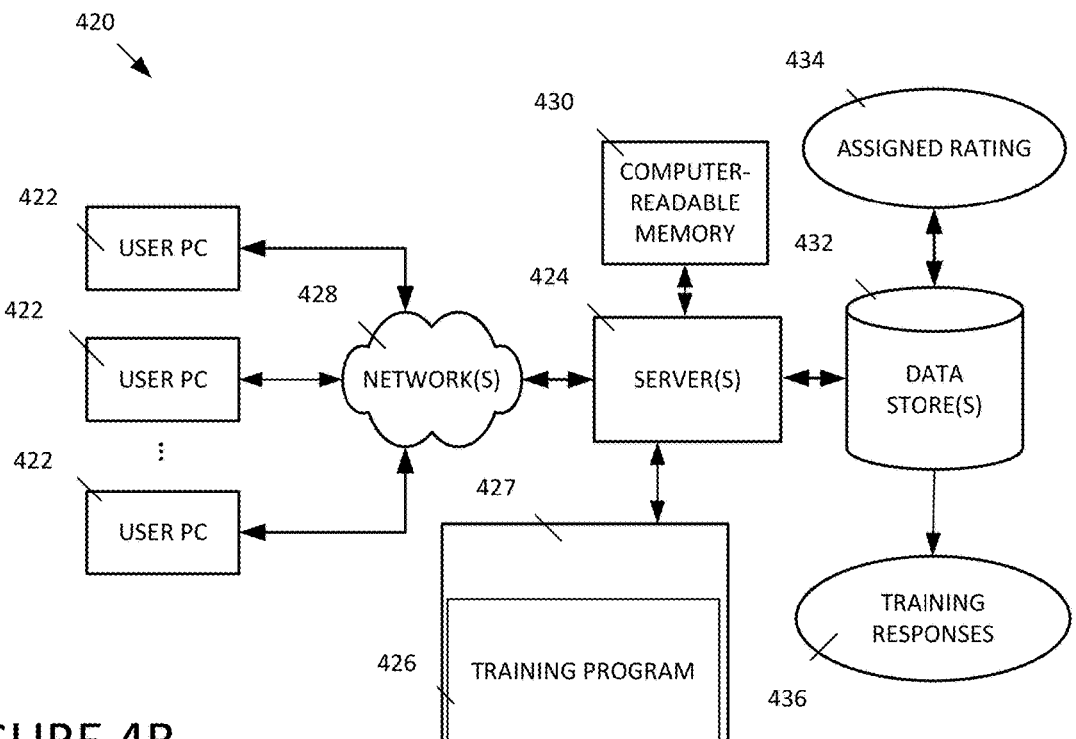
Figure 4C:
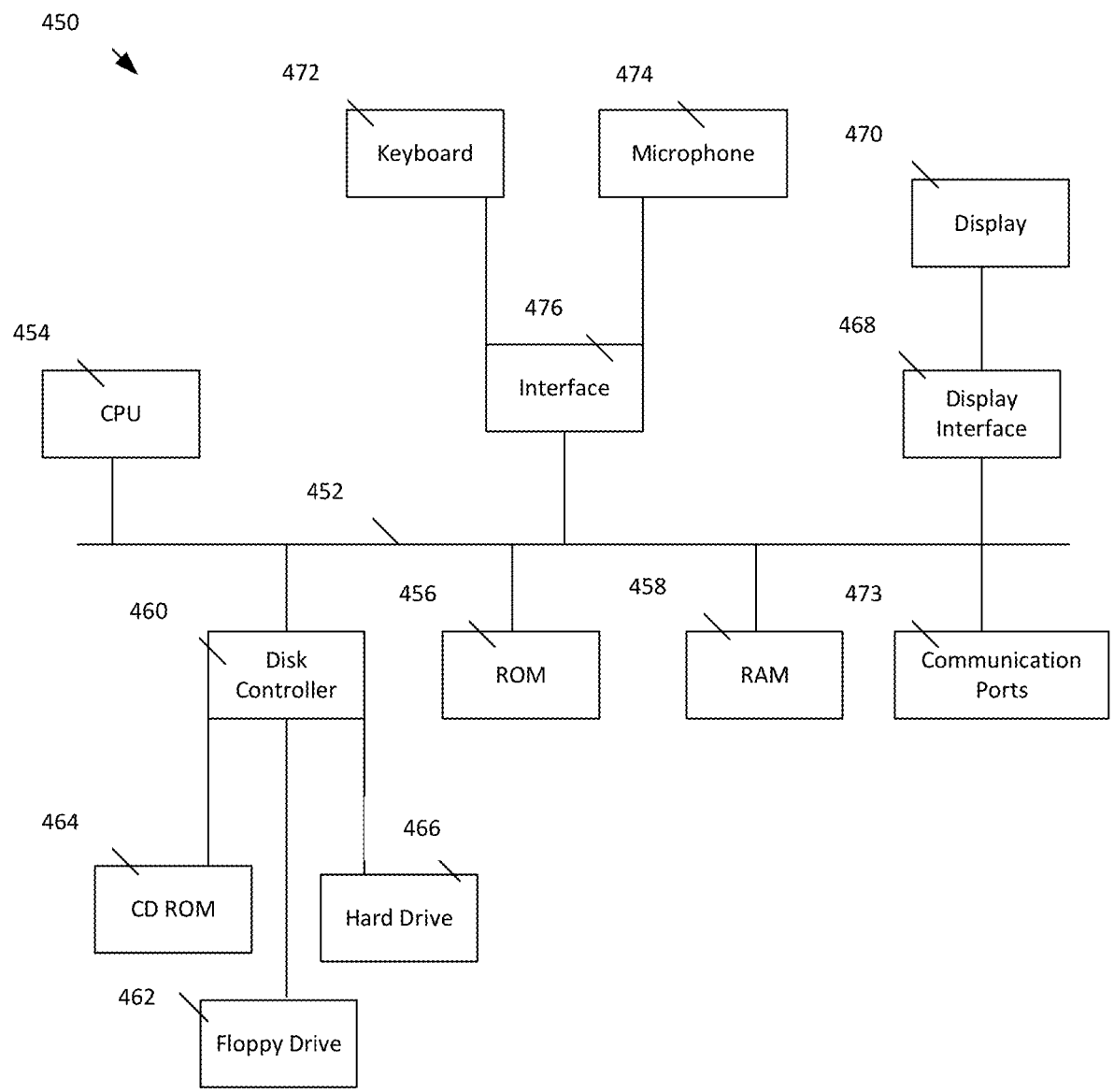

Additional examples will now be described with regard to additional exemplary aspects of implementation of the approaches described herein. FIGS. 4A, 4B, and 4C depict example systems for use in implementing a system for training raters to rate constructed responses to a task. For example, FIG. 4A depicts an exemplary system 400 that includes a standalone computer architecture where a processing system 402 (e.g., one or more computer processors located in a given computer or in multiple computers that may be separate and distinct from one another) includes a training program 404 being executed on it. The processing system 402 has access to a computer-readable memory 406 in addition to one or more data stores/data sources 408. The one or more data stores 408 may include training responses 410 as wellc 412.

FIG. 4B depicts a system 420 that includes a client server architecture. One or more user PCs 422 access one or more servers 424 running a training program 426 on a processing system 427 via one or more networks 428. The one or more servers 424 may access a computer readable memory 430 as well as one or more data stores 432. The one or more data stores 432 may contain training responses 434 as well as trainee raters' 436.

FIG. 4C shows a block diagram of exemplary hardware for a standalone computer architecture 450, such as the architecture depicted in FIG. 4A that may be used to contain and/or implement the program instructions of system embodiments of the present invention. A bus 452 may serve as the information highway interconnecting the other illustrated components of the hardware. A processing system 454 labeled CPU (central processing unit) (e.g., one or more computer processors at a given computer or at multiple computers), may perform calculations and logic operations required to execute a program. A non-transitory processor-readable storage medium, such as read only memory (ROM) 456 and random access memory (RAM) 458, may be in communication with the processing system 454 and may contain one or more programming instructions for the training program. Optionally, program instructions may be stored on a non-transitory computer readable storage medium such as a magnetic disk, optical disk, recordable memory device, flash memory, or other physical storage medium.

A disk controller 460 interfaces one or more optional disk drives to the system bus 452. These disk drives may be external or internal floppy disk drives such as 462, external or internal CD-ROM, CD-R, CD-RW or DVD drives such as 464, or external or internal hard drives 466. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 460, the ROM 456 and/or the RAM 458. Preferably, the processor 454 may access each component as required.

A display interface 468 may permit information from the bus 452 to be displayed on a display 470 in audio, graphic, or alphanumeric format. Communication with external devices may optionally occur using various communication ports 473.

In addition to the standard computer-type components, the hardware may also include data input devices, such as a keyboard 472, or other input device 474, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. A computer-implemented method of training raters to rate written constructed responses to tasks, comprising:
    providing a crowd source web portal whereby members of the public can sign up to become raters without regard to educational qualification, degrees obtained, grade point average, certifications, or experience in a particular subject area to be rated;
    receiving data associated with the members of the public who signed up on the crowd source web portal to become raters;
    forming a pool of trainee raters from the members of the public who signed up on the crowd source web portal to become raters;
    selecting, from the pool of trainee raters, a plurality of trainee raters for rating written constructed responses without regard to particular rating experience and/or particular subject matter expertise;
    training, in individual training sessions lasting less than one hour, the trainee raters to rate responses to a task, each individual training session providing training for a single trainee rater and comprising:
        transmitting the task to the single trainee rater over a network,
        presenting the task to the single trainee rater by displaying the task on an interactive graphical user interface;
        presenting a rating rubric, including a rating scale with a plurality of rating levels, descriptions of dimensions on which rating is to be based, and exemplary responses corresponding to the rating levels;
        presenting training responses to the task using the interactive graphical user interface;
        receiving, through the interactive graphical user interface, ratings assigned to the training responses by the trainee rater;
        presenting feedback for each received rating assigned by the trainee rater, wherein the feedback is presented substantially immediately upon receipt of the rating assigned by the trainee rater; and
        determining a score for each of the received ratings assigned by the trainee rater;
    determining multiple statistical measures for each trainee rater's performance during the trainee rater's individual training session, the trainee rater's performance including the scores received by the trainee rater; and
    analyzing the statistical measures for each trainee rater's performance using a statistical computer model trained based on a reference pool of different trainee raters previously selected as qualified;
    selecting qualified raters from the plurality of trainee raters, after the training, based upon the analyses of the statistical measures from the individual training sessions;
    assigning to the qualified raters one or more written constructed responses to be rated;
    transmitting the one or more written constructed responses to the qualified raters over the network;
    presenting the one or more written constructed responses to the qualified raters by displaying the one or more written constructed responses on the interactive graphical user interface; and
    receiving a score from one of the one or more to the qualified raters.

2. The computer-implemented method of claim 1, wherein the plurality of trainee raters include individuals without prior rating experience and without educational credentials in language or linguistics.

3. The computer-implemented method of claim 1, wherein the plurality of trainee raters are selected using a crowd sourcing interface.

4. The computer-implemented method of claim 1, wherein the feedback is based on a comparison of the received rating assigned by the trainee rater and a predetermined rating assigned to the associated training response.

5. The computer-implemented method of claim 4, wherein the feedback includes a message indicating a discrepancy between the rating assigned by the rater and the predetermined rating.

6. The computer-implemented method of claim 1, wherein each of the qualified raters does not receive additional training after the qualified rater's individual training session and before the qualified rater is assigned the one or more written constructed responses.

7. The computer-implemented method of claim 6, further comprising:
    presenting to one of the qualified raters a selected response selected from the one or more written constructed responses and one or more quality-assurance responses, the presentation of the selected response including no indication as to whether the selected response is selected from the written constructed responses or the quality-assurance responses;
    receiving, through the interactive graphical user interface, a rating assigned to the selected response by the qualified rater;
    when the selected response is one of the quality-assurance responses, presenting a feedback to the qualified rater based on a comparison of the received rating assigned to the selected response and a predetermined rating of the corresponding quality-assurance response.

8. The computer-implemented method of claim 1, wherein each of the one or more written constructed responses is assigned to and rated by more than one of the qualified raters, and wherein a final rating for that written constructed response is based on an aggregation of ratings it receives from the qualified raters.

9. The computer-implemented method of claim 1, wherein selecting a plurality of trainee raters is fully automated.

10. The computer-implemented method of claim 1, wherein the written constructed responses are transmitted to trainee raters over a network from writers of the written constructed responses, and wherein the writers construct the written constructed responses in response to questions received over the network.

11. The computer-implemented method of claim 1, wherein the written constructed responses are displayed for scoring and receiving scores using a remote user interface.

12. A system for training raters to rate written constructed responses to tasks, comprising:
a processing system; and
a memory;
wherein the processing system is configured to execute steps comprising:
providing a crowd source web portal whereby members of the public can sign up to become raters without regard to educational qualification, degrees obtained, grade point average, certifications, or experience in a particular subject area to be rated;
receiving data associated with the members of the public who signed up on the crowd source web portal to become raters;
forming a pool of trainee raters from the members of the public who signed up on the crowd source web portal to become raters;
selecting, from the pool of trainee raters, a plurality of trainee raters for rating written constructed responses without regard to particular rating experience and/or particular subject matter expertise;
training, in individual training sessions lasting less than one hour, the trainee raters to rate responses to a task, each individual training session providing training for a single trainee rater and comprising:
transmitting the task to the single trainee rater over a network,
presenting the task to the single trainee rater by displaying the task on an interactive graphical user interface;
presenting a rating rubric, including a rating scale with a plurality of rating levels, descriptions of dimensions on which rating is to be based, and exemplary responses corresponding to the rating levels;
presenting training responses to the task using the interactive graphical user interface;
receiving, through the interactive graphical user interface, ratings assigned to the training responses by the trainee rater;
presenting feedback for each received rating assigned by the trainee rater, wherein the feedback is presented substantially immediately upon receipt of the rating assigned by the trainee rater; and
determining a score for each of the received ratings assigned by the trainee rater;
determining multiple statistical measures for each trainee rater's performance during the trainee rater's individual training session, the trainee rater's performance including the scores received by the trainee rater; and
analyzing the statistical measures for each trainee rater's performance using a statistical computer model trained based on a reference pool of different trainee raters previously selected as qualified;
selecting qualified raters from the plurality of trainee raters, after the training, based upon the analyses of the statistical measures from the individual training sessions;
assigning to the qualified raters one or more written constructed responses to be rated;
transmitting the one or more written constructed responses to the qualified raters over the network;
presenting the one or more written constructed responses to the qualified raters by displaying the one or more written constructed responses on the interactive graphical user interface; and
receiving a score from one of the one or more to the qualified raters.

13. The system of claim 12, wherein the plurality of trainee raters include individuals without prior rating experience and without educational credentials in language or linguistics.

14. The system of claim 12, wherein the plurality of trainee raters are selected using a crowd sourcing interface.

15. The system of claim 12, wherein the feedback is based on a comparison of the received rating assigned by the trainee rater and a predetermined rating assigned to the associated training response, and wherein the feedback includes a message indicating a discrepancy between the rating assigned by the rater and the predetermined rating.

16. The system of claim 12, wherein each of the qualified raters does not receive additional training after the qualified rater's individual training session and before the qualified rater is assigned the one or more written constructed responses.

17. The system of claim 16, wherein the processing system is configured to execute steps comprising:
presenting to one of the qualified raters a selected response selected from the one or more written constructed responses and one or more quality-assurance responses, the presentation of the selected response including no indication as to whether the selected response is selected from the written constructed responses or the quality-assurance responses;
receiving, through the interactive graphical user interface, a rating assigned to the selected response by the qualified rater;
when the selected response is one of the quality-assurance responses, presenting a feedback to the qualified rater based on a comparison of the received rating assigned to the selected response and a predetermined rating of the corresponding quality-assurance response.

18. A non-transitory computer-readable medium for training raters to rate written constructed responses to tasks, comprising instructions which when executed cause a processing system to carry out steps comprising:
providing a crowd source web portal whereby members of the public can sign up to become raters without regard to educational qualification, degrees obtained, grade point average, certifications, or experience in a particular subject area to be rated;
receiving data associated with the members of the public who signed up on the crowd source web portal to become raters;
forming a pool of trainee raters from the members of the public who signed up on the crowd source web portal to become raters;
selecting, from the pool of trainee raters, a plurality of trainee raters for rating written constructed responses without regard to particular rating experience and/or particular subject matter expertise;
training, in individual training sessions lasting less than one hour, the trainee raters to rate responses to a task, each individual training session providing training for a single trainee rater and comprising:
transmitting the task to the single trainee rater over a network,
presenting the task to the single trainee rater by displaying the task on an interactive graphical user interface;

presenting a rating rubric, including a rating scale with a plurality of rating levels, descriptions of dimensions on which rating is to be based, and exemplary responses corresponding to the rating levels;

presenting training responses to the task using the interactive graphical user interface;

receiving, through the interactive graphical user interface, ratings assigned to the training responses by the trainee rater;

presenting feedback for each received rating assigned by the trainee rater, wherein the feedback is presented substantially immediately upon receipt of the rating assigned by the trainee rater; and determining a score for each of the received ratings assigned by the trainee rater;

determining a score for each of the received ratings assigned by the trainee rater;

determining multiple statistical measures for each trainee rater's performance during the trainee rater's individual training session, the trainee rater's performance including the scores received by the trainee rater; and analyzing the statistical measures for each trainee rater's performance using a statistical computer model trained based on a reference pool of different trainee raters previously selected as qualified;

selecting qualified raters from the plurality of trainee raters, after the training, based upon the analyses of the statistical measures from the individual training sessions;

assigning to the qualified raters one or more written constructed responses to be rated;

transmitting the one or more written constructed responses to the qualified raters over the network;

presenting the one or more written constructed responses to the qualified raters by displaying the one or more written constructed responses on the interactive graphical user interface; and receiving a score from one of the one or more to the qualified raters.

19. The non-transitory computer-readable medium of claim 18, wherein the plurality of trainee raters include individuals without prior rating experience and without educational credentials in language or linguistics.

20. The non-transitory computer-readable medium of claim 18, wherein the feedback is based on a comparison of the received rating assigned by the trainee rater and a predetermined rating assigned to the associated training response.

21. The non-transitory computer-readable medium of claim 18, wherein each of the qualified raters does not receive additional training after the qualified rater's individual training session and before the qualified rater is assigned the one or more written constructed responses.

22. The computer-implemented method of claim 21, further comprising:

presenting to one of the qualified raters a selected response selected from the one or more written constructed responses and one or more quality-assurance responses, the presentation of the selected response including no indication as to whether the selected response is selected from the written constructed responses or the quality-assurance responses;

receiving, through the interactive graphical user interface, a rating assigned to the selected response by the qualified rater;

when the selected response is one of the quality-assurance responses, presenting a feedback to the qualified rater based on a comparison of the received rating assigned to the selected response and a predetermined rating of the corresponding quality-assurance response.

23. The non-transitory computer-readable medium of claim 18, wherein each of the one or more written constructed responses is assigned to and rated by more than one of the qualified raters, and wherein a final rating for that written constructed response is based on an aggregation of ratings it receives from the qualified raters.

* * * * *